United States Patent
Elhardt et al.

(10) Patent No.: US 8,276,699 B2
(45) Date of Patent: Oct. 2, 2012

(54) MOUNTING ARRANGEMENT FOR TRACTOR FRONT GRILLE TO SHROUD

(75) Inventors: Paul M. Elhardt, Charlotte, NC (US);
Joseph P. Latchaw, York, SC (US);
Jared B. Lard, Charlotte, NC (US)

(73) Assignee: Deere & Company, Moline, IL (US)

( * ) Notice: Subject to any disclaimer, the term of this patent is extended or adjusted under 35 U.S.C. 154(b) by 79 days.

(21) Appl. No.: 12/894,744

(22) Filed: Sep. 30, 2010

(65) Prior Publication Data

US 2012/0080255 A1    Apr. 5, 2012

(51) Int. Cl.
*B60K 11/04* (2006.01)
(52) U.S. Cl. .............. 180/68.6; 180/69.2; 180/69.24
(58) Field of Classification Search .............. 180/69.21, 180/68.1, 68.4, 68.6, 69.2, 68.5, 69.24; 296/100.1, 296/100.08, 100.09
See application file for complete search history.

(56) References Cited

U.S. PATENT DOCUMENTS

| | | | | |
|---|---|---|---|---|
| 4,403,648 | A * | 9/1983 | Styok | 180/68.6 |
| 6,298,906 | B1 * | 10/2001 | Vize | 180/68.1 |
| 6,401,851 | B1 * | 6/2002 | Keen | 180/69.21 |
| 6,470,961 | B1 * | 10/2002 | Case | 180/68.4 |
| 6,487,754 | B1 * | 12/2002 | Keen | 180/69.21 |
| 6,634,448 | B2 * | 10/2003 | Bland | 180/68.1 |
| 6,837,326 | B2 * | 1/2005 | Haun et al. | 180/68.6 |
| 7,051,786 | B2 * | 5/2006 | Vuk | 180/68.1 |
| 7,418,994 | B2 * | 9/2008 | Evans et al. | 180/68.1 |
| 2004/0216934 | A1 * | 11/2004 | Tomiyama et al. | 180/68.1 |
| 2005/0029028 | A1 | 2/2005 | Steinmacher | |
| 2005/0211487 | A1 * | 9/2005 | Obe et al. | 180/69.21 |

FOREIGN PATENT DOCUMENTS

| | | |
|---|---|---|
| DE | 102004057477 | 6/2006 |
| WO | 9501264 | 1/1995 |

OTHER PUBLICATIONS

European Search Report, Feb. 29, 2012, 6 pages.

* cited by examiner

*Primary Examiner* — Hau Phan

(57) ABSTRACT

A mounting arrangement for a tractor front grille to a shroud includes a one-piece shroud having a radiator mounted thereto and a central opening to draw air through the radiator, and a tractor front grille slidably mounted to the shroud so that the grille can only move substantially vertically to access a battery behind the front grille. The battery may be positioned on a battery shelf that extends forwardly from and is integral with the shroud.

9 Claims, 3 Drawing Sheets

MOUNTING ARRANGEMENT FOR TRACTOR FRONT GRILLE TO SHROUD

FIELD OF THE INVENTION

This invention relates to mounting a tractor front grille to a shroud, and specifically to a mounting arrangement between the grille and shroud that enables the grille to slide vertically to provide access to the battery behind the grille.

BACKGROUND OF THE INVENTION

Utility vehicles such as tractors with internal combustion engines have engine cooling systems that draw air from a front grille through a radiator into the engine compartment. The engine cooling system typically includes a radiator assembly with a cooling fan surrounded by a shroud. The cooling fan may be provided to force flow of cooling air across the radiator. The radiator may be disposed forwardly of the cooling fan, and the cooling fan may be disposed forwardly of the engine.

Optimum performance of the engine cooling system requires the tractor front grille be sealed to the fan shroud, so that air flow must be through the grille. The seal also should block or minimize air flow around the first or engine side of the radiator assembly (i.e., the hot engine compartment) to the second or cool side of the radiator assembly (i.e., facing the front grille). Efforts to seal the tractor front grille to the fan shroud against air leakage have involved sealing materials to fill gaps between the bottom and sides of the radiator assembly, and the grille and/or side panels extending rearwardly from the grille. For example, foam or rubber sealing material may be used to fill any gaps between the radiator assembly and the grille and/or side panels. An improved, simplified, stronger and less costly mounting arrangement between a tractor front grille and shroud is needed that provides a seal between the grille and shroud.

In many tractors, a battery may be positioned forwardly of the radiator on a battery tray mounted to the tractor frame or fan shroud using mounting hardware. Installation or removal of the battery from the battery tray can be difficult. An improved, simplified, and less costly mounting arrangement is needed that can support a battery behind the tractor front grille, and to provide easy access to remove or service the battery.

In addition to the radiator, fan, and fan shroud, the radiator assembly may include structural components that support the radiator and fan shroud and/or attach those structures to the frame or body of the tractor, parts that seal the radiator assembly and air intake passages, and auxiliary items such as coolant recovery bottles. As a result, a typical tractor radiator package has a large number of parts and requires substantial assembly time, at a significant cost. It is desirable to decrease tractor cost by providing a mounting arrangement between a tractor front grille and shroud that reduces the number of parts and shortens assembly time.

SUMMARY OF THE INVENTION

A mounting arrangement for a tractor front grille to a shroud includes a one-piece shroud having a radiator mounted thereto and a central opening to draw air through the radiator, and a tractor front grille slidably mounted to the shroud so that the grille can only move substantially vertically to access a battery behind the front grille. The battery may be positioned on a battery shelf that extends forwardly from and is integral with the shroud.

DESCRIPTION OF THE PREFERRED EMBODIMENT

Figure 1:
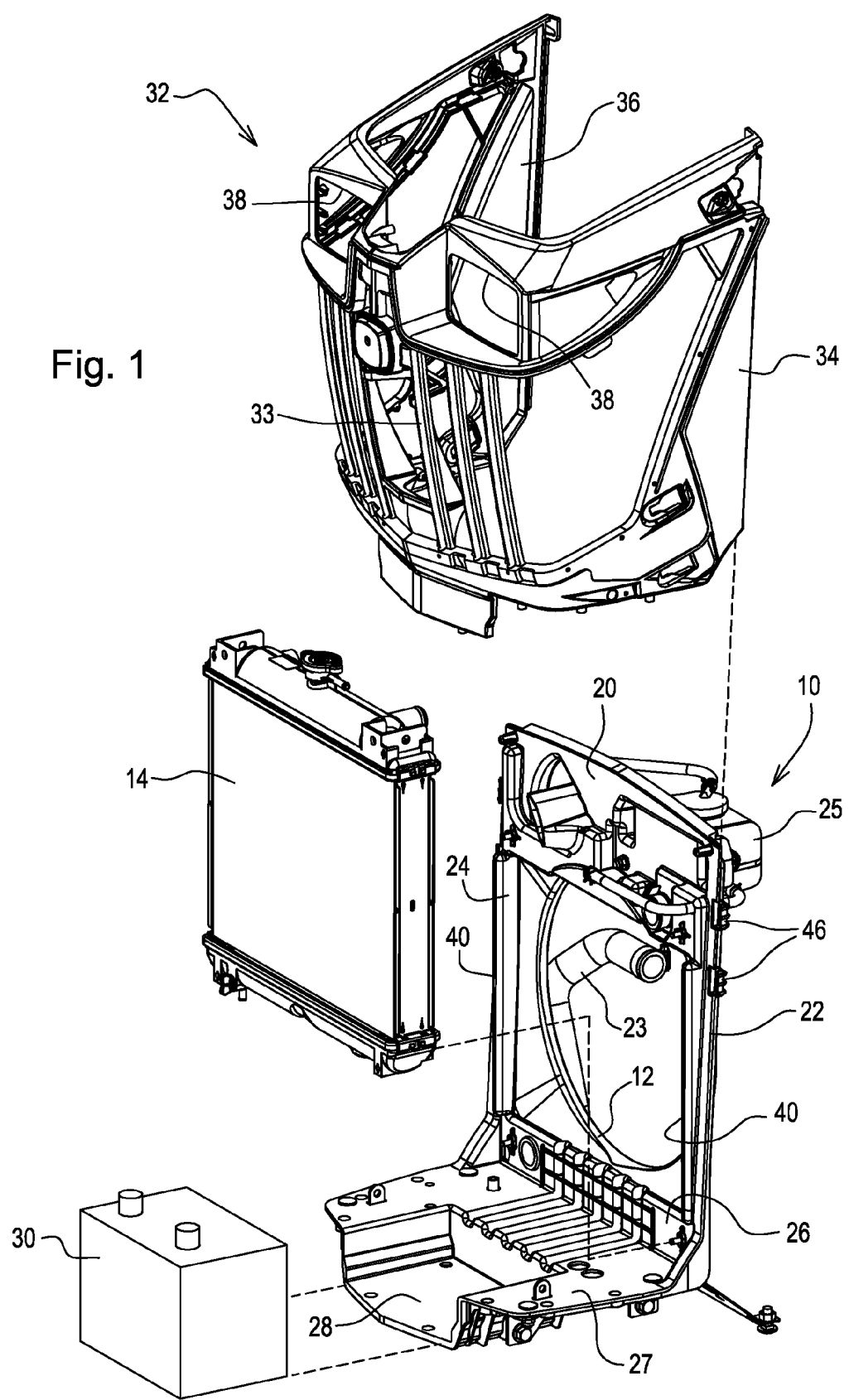
FIG. 1 is an exploded front perspective view of a mounting arrangement for a tractor front grille to a shroud according to a first embodiment of the invention.
Figure 2:
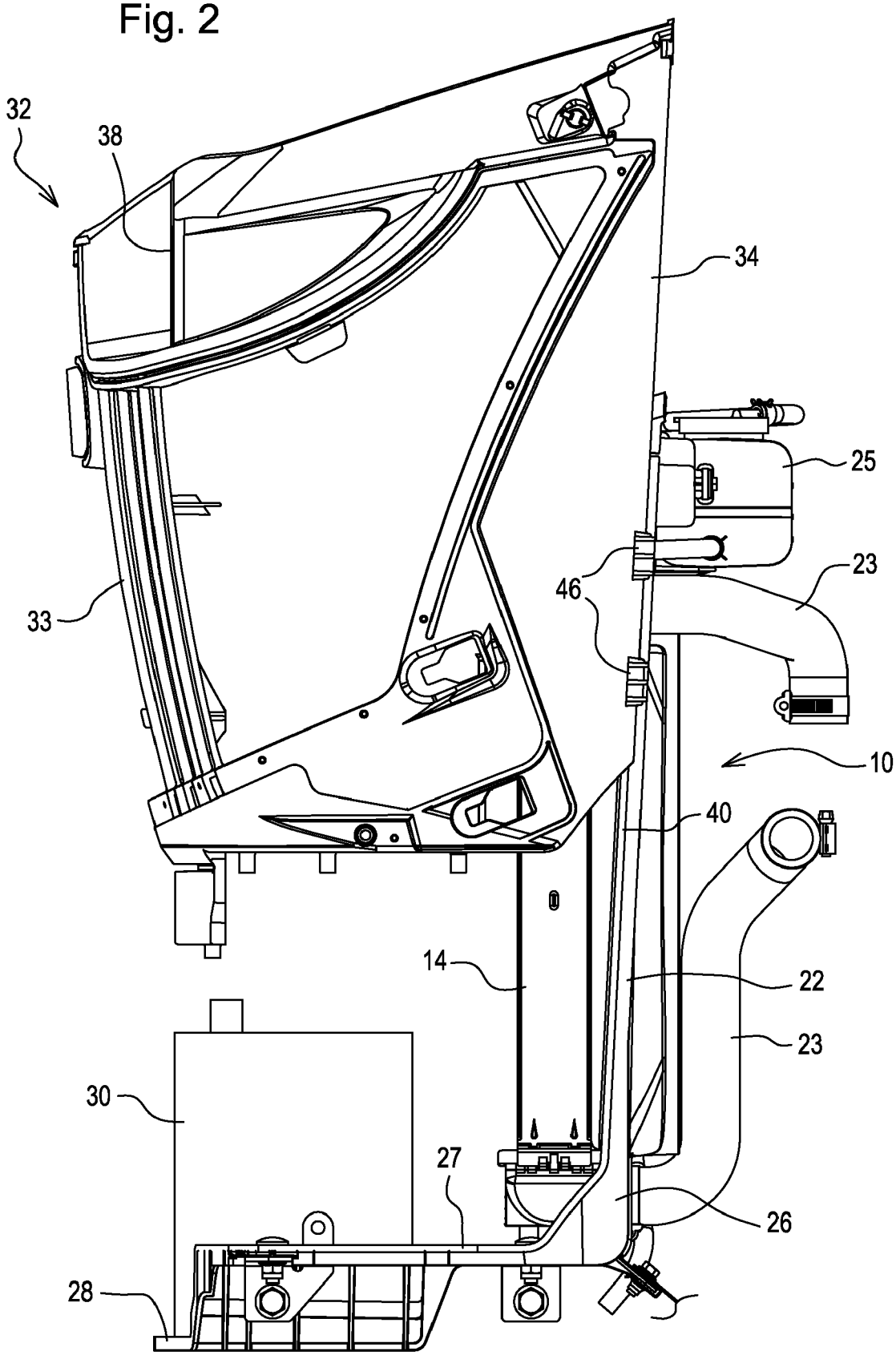
FIG. 2 is a side view of a mounting arrangement for a tractor front grille to a shroud, with the grille in a partially raised position, according to an embodiment of the invention.

In a preferred embodiment shown in FIGS. 1-2, shroud 10 may be a one piece molded plastic structure that serves as a fan shroud, radiator support and battery shelf for a tractor. Tractor front grille 32 may be mounted and sealed to the shroud using a vertically sliding interfit. The front grille may slide up to access battery 30 for replacement or service.

In one embodiment, shroud 10 may be positioned and fastened directly to the tractor frame or chassis of a tractor forwardly of an internal combustion engine. Radiator 14 may be fastened to and supported by the shroud. The shroud may have a central opening 12 dimensioned so that a fan (not shown) can draw air through radiator 14. The fan may rotate on a generally longitudinal axis, and may be driven by the engine, or may be electrically or hydraulically powered, and may have a plurality of blades which rotate to cause air to move through a radiator.

In one embodiment, shroud 10 may have an upper portion 20 above the central opening, left and right sides 22, 24 on each side of the central opening, and a lower portion 26 below the central opening. One or more radiator hoses 23 may extend through or be attached to flanges on the upper and/or lower portions of the shroud, and reservoir 25 may be attached thereto.

Additionally, shroud 10 may have a substantially horizontal portion 27 extending forwardly from the lower portion, and may include battery shelf 28 which may include or provide a platform recessed below the horizontal portion. Battery 30 may be positioned on and supported by the battery shelf at a location between the shroud and front grille 32.

In one embodiment, tractor front grille 32 may be mounted to shroud 10 so that the front grille may slide vertically or nearly vertically. The front grille may be a one piece plastic structure that holds one or more wire mesh screens (not shown) on front 33 and left and right sides 34, 36. The left and right sides of the tractor front grille may wrap at least partially around the front end of a tractor forwardly of the engine. Tractor hood (not shown) may extend at least partially over the top of the grille and may extend forwardly at least partially over the left and right sides of the grille. The tractor hood may be hinged, or may slide or lift to open. The tractor hood may not be fastened to the grille, or may be removably fastened to the grille. The front grille also may include headlight mounting pockets 38. A headlight may be mounted in each of the headlight mounting pockets using two fasteners for each headlight.

Figure 3:
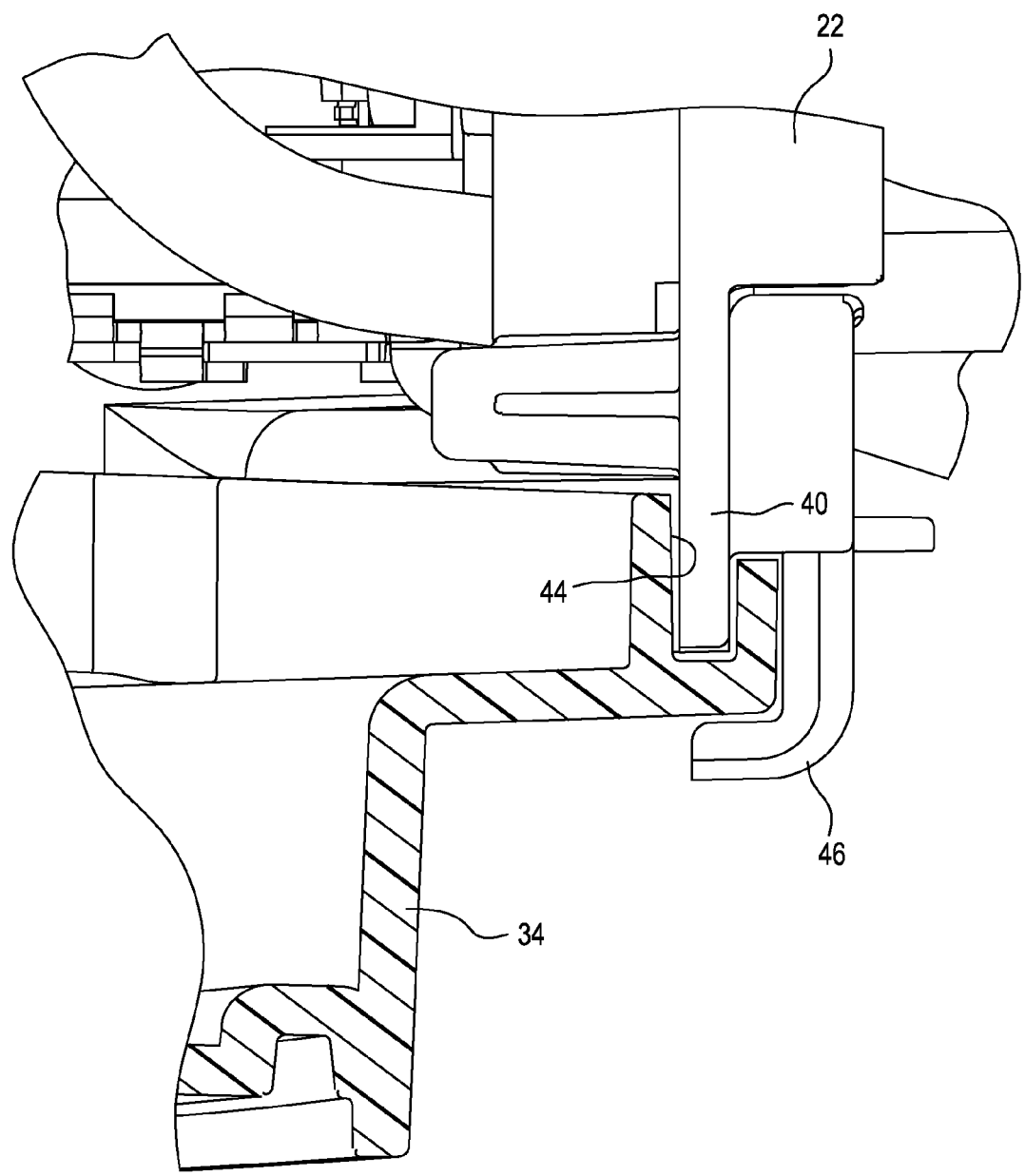
FIG. 3 is a section view of the interfit between the tractor front grille and shroud using the mounting arrangement according to one embodiment of the invention.

As indicated above, tractor front grille 32 may only move substantially vertically with respect to shroud 10. The front grille may be lowered downwardly for installation, and raised upwardly to remove and separate the front grille from the shroud, or to access, maintain, remove and/or replace the battery on battery shelf 28. For example, as shown in FIG. 3, the left and right sides of the front grille may have rib structures 40 that slidingly engage slots or channels 44 on the left and right sides of the shroud. Or, in an alternative embodiment, the left and right sides of the shroud may have rib structures that slidingly engage slots or channels on the left and right sides of the front grille. The sliding structures should be sufficiently tight so that no additional sealing is needed between the left and right sides of the shroud and front grille.

The sliding interfit between the edges of shroud 10 and front grille 32 may hold the grille to the shroud, provide strength and stiffness between the shroud and grille, and prevent separation in all directions except vertically. Additionally, the sliding interfit may create a tight seal between the shroud and front grille and eliminate any need for additional seals or seal parts therebetween.

In one embodiment, shroud 10 may have a dovetail interfit with tractor front grille 32. For example, as shown in FIG. 3, one or more retaining structures 46 may be provided on the shroud and/or front grille to help retain and/or lock the sliding rib structures in the slots or channels. In FIG. 3, the retaining structures are shown as generally L-shaped or J-shaped fingers. However, the retaining structures may be any structure having a shape that permits only substantially vertical movement of the grille with respect to the shroud.

In one embodiment, tractor front grille 32 also may engage the horizontal portion 27 of the shroud in the lowered position. For example, in the lowered position, the front 33, and left and right sides 34, 36 may abut or engage the horizontal portion of the shroud and/or battery shelf 28. Additionally, the grille may be secured to shroud 10 in the lowered position using a plurality of quick detach fasteners inserted through both the grille and shroud. An operator may fasten and unfasten the quick detach fasteners without tools. For example, self tapping fasteners may be used. Once the fasteners are loosened or removed, an operator may slide the front grille upwardly to access the battery on the battery shelf.

In one embodiment, shroud 10 and front grille 32 may be injection molded glass reinforced plastic. For example, the shroud and front grille may be molded or formed from a polymeric material such as glass fiber mineral reinforced, highly chemically coupled polypropylene.

Having described the preferred embodiment, it will become apparent that various modifications can be made without departing from the scope of the invention as defined in the accompanying claims.

The invention claimed is:

1. A mounting arrangement for a tractor front grille to a shroud, comprising:
the shroud being one-piece and having a radiator mounted thereto and having a central opening to draw air through the radiator; and
the tractor front grille being slidably mounted to the shroud so that the grille can only move substantially vertically to access a battery behind the front grille;
wherein the shroud has sides that wrap at least partially around a front end of a tractor.

2. The mounting arrangement of claim 1 further comprising a battery shelf extending forwardly from the shroud and integral with the shroud.

3. The mounting arrangement of claim 1 wherein one of the shroud and the front grille has a pair of substantially vertically aligned rib structures on a left side and a right side thereof, and the other of the shroud and the front grille has a pair of substantially vertically aligned slots that the rib structures slide in.

4. A mounting arrangement for a tractor front grille to a shroud, comprising:
a rib structure having a sliding interfit with a channel on each side of a central opening through the shroud, the rib structure and channel securing the grille to the shroud and being substantially vertically aligned so that the grille can move only substantially vertically with respect to the shroud; and
a battery tray that is integral with and extends substantially horizontally from the shroud;
wherein the grille is a one piece plastic structure having a left side and a right side that wrap at least partially around a front end of a tractor.

5. The mounting arrangement of claim 4 further comprising a radiator mounted to the shroud.

6. The mounting arrangement of claim 4 wherein the shroud is molded plastic.

7. A mounting arrangement for a tractor front grille to a shroud, comprising:
a battery positioned on a substantially horizontal shelf extending forwardly from and integral with the shroud; and
the front grille having a front, a left side and a right side around the battery, the left side and right side being slidably mounted to the shroud for moving the front grille only substantially vertically to access the battery.

8. The mounting arrangement of claim 7 further comprising a radiator mounted to the shroud forwardly of a central opening in the shroud.

9. The mounting arrangement of claim 7 further comprising a rib structure that slides in a slot on each of the left and the right sides of the tractor front grille to slidably mount the front grille to the shroud.

* * * * *